Figures 1, 2:
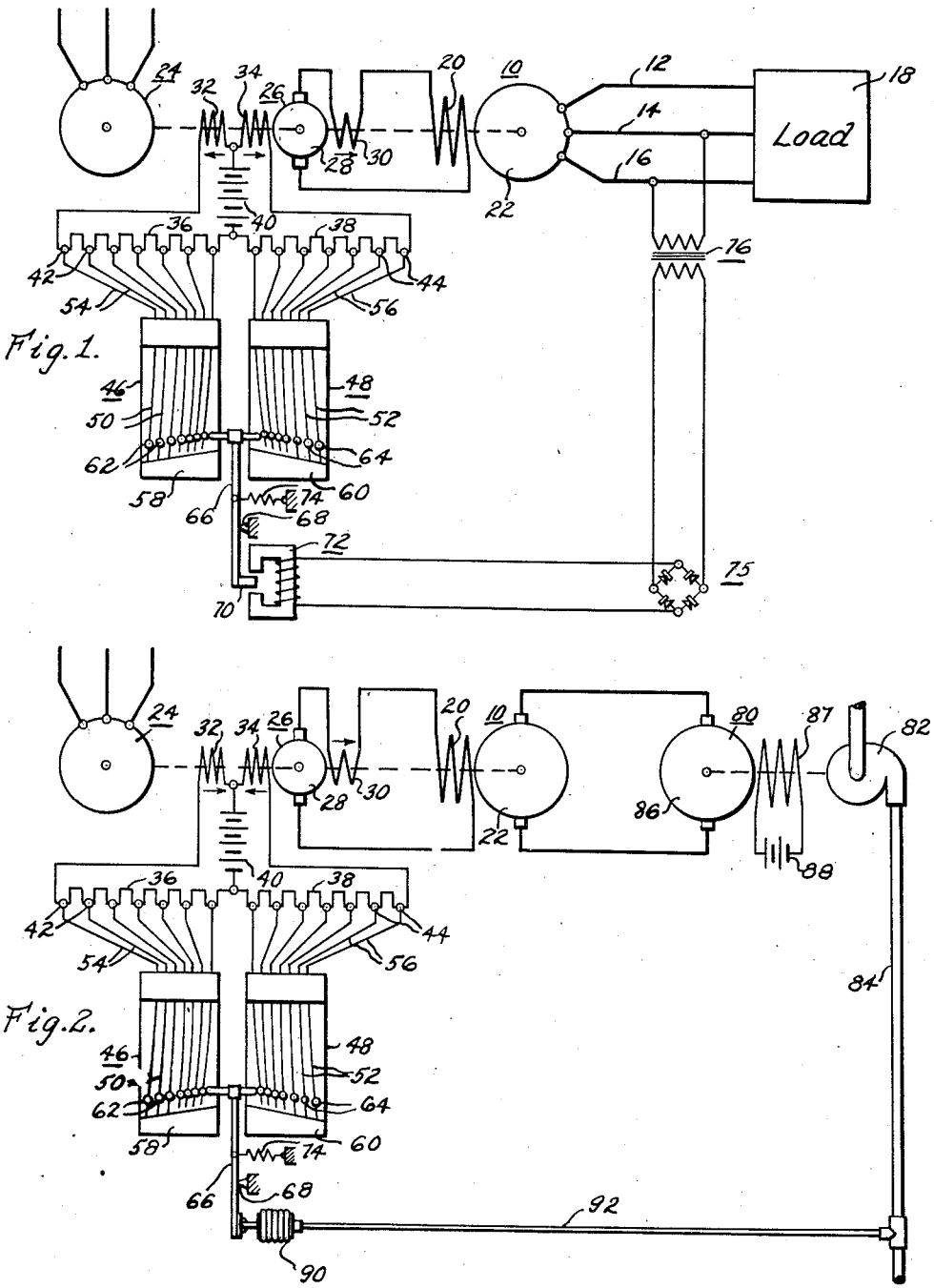

Aug. 19, 1947.   S. L. LINDBECK   2,426,035
GENERATOR VOLTAGE REGULATION
Filed Nov. 20, 1943

WITNESSES:
Alice L. Howell
Mrs. C. Groome

INVENTOR
Simon L. Lindbeck.
BY
James K. Ely
ATTORNEY

Patented Aug. 19, 1947

2,426,035

UNITED STATES PATENT OFFICE 2,426,035

GENERATOR VOLTAGE REGULATION

Simon L. Lindbeck, Wilkinsburg, Pa., assignor to Westinghouse Electric Corporation, East Pittsburgh, Pa., a corporation of Pennsylvania Application November 20, 1943, Serial No. 511,036

3 Claims. (Cl. 171—312)

1

This invention relates to electrical circuits and, in particular, to regulating systems for controlling the operation of a dynamo-electric machine in accordance with changes in a quantity to be regulated.

An object of this invention is the provision of a regulating system for maintaining substantially constant a predetermined characteristic of a dynamo-electric machine.

Another object of this invention is to provide for controlling the excitation of a self-energized direct-current generator to control the operation of a dynamo-electric machine in response to changes in a quantity to be regulated.

Other objects of this invention will become apparent from the following description taken in conjunction with the accompanying drawing, in which:

Figure 1 is a diagrammatic view of apparatus and circuits embodying the teachings of this invention; and Fig. 2 is a diagrammatic view of apparatus and circuits illustrating another embodiment of this invention.

Referring to Fig. 1 of the drawing, this invention is illustrated by reference to a system for controlling the excitation of an alternating-current generator 10 which is connected by conductors 12, 14 and 16 to supply a load 18. The alternating-current generator 10 comprises a field winding 20 and an armature member 22, which is disposed to be driven by a motor 24.

In order to control the excitation of the generator 10, a direct-current exciter 26, which is also disposed to be driven by the motor 24, is provided, the exciter 26 having an armature member 28 and a main series field winding 30 which are connected in series circuit with each other and the field winding 20 of the generator 10. In addition to the series field winding 30, the exciter 26 also has a pair of opposed separately excited field windings 32 and 34 disposed to cooperate with the series field winding 30 in controlling the excitation of the generator 10. The main series field winding 30 is utilized to give the main excitation of the machine 26, the differential of opposed windings being small in comparison and being utilized to regulate the operation of the machine over a predetermined working range.

As illustrated, each of the opposed field windings 32 and 34 of the exciter 26 is connected through a field rheostat 36 and 38, respectively, to a source of power, such as the battery 40. The field rheostats 36 and 38 are formed of a plurality of sections and are provided with taps 42 and 44, respectively, which are connected to suitable circuit controlling apparatus 46 and 48, respectively, for controlling the amount of resistance in circuit with the associated windings 32 and 34.

The circuit controlling devices 46 and 48 illustrated are of the type disclosed and claimed in Patent No. 2,246,301, which issued June 17, 1941, to C. R. Hanna et al., and which is assigned to the same assignee as this invention. Briefly, the circuit controlling devices 46 and 48 comprise a plurality of long thin conducting leaves 50 and 52, respectively, having one end of each leaf secured in fixed relation and insulated from adjacent leaves, the fixed ends of the leaves 50 and 52 being connected by leads 54 and 56, respectively, to the taps 42 and 44, respectively, of the field rheostats 36 and 38. The leaves 50 and 52 are of conducting material, being self-biased to seat against sloped or inclined stops 58 and 60, respectively, to maintain the contact members 62 and 64 carried on the free ends of the leaves 50 and 52, respectively, in spaced relation.

In the embodiment illustrated in Fig. 1, the circuit controlling devices 46 and 48 are disposed in reversed position with respect to each other, so that a single driving member 66 may be utilized for effecting a simultaneous, but inverse, operation or movement of the leaves 50 and 52 away from and toward the sloped stops 58 and 60, respectively. The driving member 66 is preferably formed of a long lever pivotally mounted as at 68 and carries an armature member 70 of an electromagnetic device 72 at one end thereof, a spring member 74 being provided for purpose of balancing the magnetic pull of the electromagnetic device 72. The electromagnetic device 72 is disposed to be connected through a rectifying device 75 and a transformer 76 across conductors 14 and 16, so that the electromagnetic device 72 is energized in accordance with a change in the voltage across conductors 14 and 16.

In addition to being positioned in reverse relation to each other, the circuit controlling devices 46 and 48 are also positioned so close together that the driver 66 in a normal balanced position so biases approximately half of the leaves of each of the devices 46 and 48 away from the sloped stops that approximately half of each of the rheostats 36 and 38 are shunted from circuit relation with the field windings 32 and 34, respectively. Thus the circuit controlling devices 46 and 48 may be so operated that in a normal balanced position half of the field rheostats 36 and 38 are connected in circuit with the associated field windings 32 and 34, and as additional sections of one of the rheostats are shunted, additional sections of the other rheostat are connected in circuit with their associated field windings.

In operation, assuming that the motor 24 is driving the exciter 26 and the generator 10 at a given rate of speed to supply the load 18, and that the circuit controlling devices 46 and 48 are in a normal operating position whereby the field windings 32 and 34 are balanced, the exciter 26 functions to effect the required excitation of the generator 10. If, however, the load changes so as to effect a change in the voltage across conductors 14 and 16, the energization of the electromagnetic device 72 is so changed as to effect an operation of the circuit controlling devices 46 and 48 to effect a change in the excitation of the exciter 26.

If, for example, the change in load is such as to effect a decrease in the voltage across conductors 14 and 16, the electromagnetic device 72 is so deenergized that the spring 74 actuates the driver member 66 in a clockwise direction about the pivot 68 to effect the progressive separation of the leaves 50 of the circuit controlling device 46 to connect additional sections of the field rheostat 36 in circuit with the field 32 of the exciter 26. Simultaneously with the operation of the leaves 50, the driver member 66 effects a progressive actuation of the leaves 52 of the circuit controlling apparatus 48 away from the sloped stop 60 to effectively and progressively shunt additional sections of the rheostat 38 from the circuit with the field winding 34. This unbalancing of the resistance in the field winding circuits effects an unbalance in the energization of the opposed field windings 32 and 34, the field winding 34 being disposed to be cumulative with the series field winding 30, whereas the field winding 32 is disposed to oppose the effect of the series field winding 30. By thus increasing the energization of the field winding 34, the field windings 34 and 30 cooperate to increase the excitation of the exciter 26 and thereby increase the excitation of the generator 10 to increase the voltage across conductors 14 and 16.

That the series field winding 30 cooperates with the opposed field windings 32 and 34 in controlling the energization of the exciter 26 is apparent when it is considered that the transient current of the generator field winding 20 increases as the load increases and flows through the series field winding 30 to increase the excitation thereof. Thus, immediately upon a change in the load, the series field winding 30 effects an anticipatory regulating action to tend to correct for the decrease in voltage across conductors 14 and 16, the opposed field windings 32 and 34 cooperating therewith a short time thereafter in effecting the required change in the excitation of the generator 10 to maintain the voltage across conductors 14 and 6 substantially constant. The slight delay in effecting the change in the balance of the field windings 32 and 34 is occasioned by reason of the mechanical delay of the apparatus utilized in controlling the connection of the rheostats 36 and 38. The series field winding 30 and the controlled opposed field windings 32 and 34 cooperate to effect a satisfactory regulation of the excitation of the generator 10 to maintain substantially constant voltage across the conductors over normal operating ranges of the machines.

In another embodiment of this invention, as illustrated in Fig. 2, the series field direct-current exciter 26 having the opposed field windings 32 and 34 and the circuit control devices 46 and 48 for controlling the excitation thereof is utilized for controlling the excitation of the dynamo-electric machine 10 which controls the operation of a motor 80 for driving a pump 82 to maintain the pressure of a fluid (not shown) in a conduit 84 substantially constant. In this embodiment, it is preferred that the dynamo-electric machine 10 be a direct-current generator, the motor 80 also being a direct-current motor. However, the dynamo-electric machine 10 having the armature member 22 and the field winding 20 may be an alternating-current generator where the motor 80 is an alternating-current motor, as, for example, an alternating-current induction motor. In any case, the motor 80 comprises an armature member 86 which is connected across the armature 22 of the dynamo-electric machine 10, and is provided with a field winding 87 disposed to be energized from a constant source of power, such as the battery 88.

In order to actuate the circuit controlling devices 46 and 48, the driver lever 66 is hinged to a pressure responsive Sylphon bellows 90 which is connected by means of the pipe 92 connected in the conduit 84. The remaining parts of the circuit and apparatus employed are the same as in Fig. 1, with the exception that the opposed field windings 32 and 34 are so wound and connected that in this embodiment the field winding 32 is cumulative in effect with the series field winding 30 of the direct-current exciter 26, whereas the field winding 34 opposes the effect of the field winding 30.

In operation, assuming that the system is operating so that the motor 80 is driving the pump 82 to deliver fluid (not shown) through the conduit 84 at a given pressure, if for any reason the pressure of the fluid in the conduit changes as, for example, if the pressure should increase, then the bellows 90 is expanded. The expansion of the bellows 90 effects a pivotal operation of the driver 66 in a clockwise direction about the pivot 68 to progressively actuate the leaves 52 of the circuit controlling device 48 away from the fixed stop 60 to progressively shunt additional sections of the rheostat 38 from series circuit with the field winding 34, while simultaneously therewith an equal number of leaves 50 are progressively released to connect additional sections of the rheostat 36 in circuit with the field winding 32. The field winding 34 is thus so energized that it opposes the effect of the series field winding 30 to effect a decrease in the energization of the dynamo-electric machine 10, thereby increasing the voltage across the armature 86 of the motor 80 to effect a decrease in the speed of the motor 80, and thereby effectively reduce the pressure of the fluid being pumped through the conduit 84.

If, on the other hand, the change in the pressure of the fluid in the conduit 84 is to decrease the pressure, the bellows 90 is operated to actuate the driver 66 in a counterclockwise direction to simultaneously operate the opposed circuit controlling members 46 and 48 to simultaneously, but inversely, change the connections of the field rheostats 36 and 38 to change the balance of the energization of the windings 32 and 34, whereby the field winding 32 cooperates with the field winding 30 to increase the excitation of the generator 26 and effect an increase in the excitation of the dynamo-electric machine 10. The resulting increase in the voltage across the armature winding 86 of the motor 80 effects an increase in the speed of the motor 80 to increase the operation of the pump 82 driven thereby to increase the pressure of the fluid in the conduit 84. The system thus operates to maintain the pressure of the fluid in the conduit substantially constant.

Although this invention has been described with reference to a voltage regulating system and to a system for maintaining the pressure of the fluid constant, it is, of course, apparent that the system utilizing the direct-current exciter 26 having a plurality of windings and the circuit controlling members 46 and 48 for controlling the energization of the opposed field windings 32 and 34 may be utilized in many different applications. It is intended, therefore, that the embodiments described hereinbefore be taken as illustrative of this invention, and that this invention be not limited thereto except as is necessitated by the scope of the appended claims.

I claim as my invention:

1. In an electrical system, in combination, a dynamo-electric machine disposed to supply a load, the dynamo-electric machine having an armature winding and a field winding, a direct-current exciter having a main series field winding connected in series circuit relation with the field winding of the dynamo-electric machine, a pair of opposed auxiliary field windings for the exciter, a rheostat disposed to be connected in circuit relation with each of the opposed field windings, and means comprising a pair of opposed switching units, each having a plurality of self-biased switching members and a common driving element therefor disposed for movement in response to a change in a quantity to be regulated to simultaneously operate the switching units to simultaneously but inversely vary the connections of the rheostats to vary the excitation of the opposed field windings, the opposed field windings and the series field windings of the exciter thereby cooperating to control the excitation of the dynamo-electric machine in a predetermined manner depending upon the change in the quantity to be regulated.

2. In a regulating system, in combination, an alternating-current generator having a field winding and an armature winding, the voltage of which is to be regulated, an exciter having a main series field winding connected in series circuit relation with the field winding of the generator, a pair of opposed separately excited field windings for the exciter, a rheostat disposed to be connected in circuit relation with each of the opposed field windings, and means comprising a pair of opposed switching units, each having a plurality of self-biased switching members and a common driving element therefor disposed for movement in response to the operation of the generator to simultaneously operate the switching units to simultaneously but inversely vary the connections of the rheostats to control the excitation of the exciter and thereby control the voltage across the armature winding of the generator.

3. In a regulating system, in combination, an alternating-current generator having a field winding and an armature winding, the voltage of which is to be regulated, an exciter having a main series field winding connected in series circuit relation with the field winding of the generator, a pair of opposed separately excited field windings for the exciter, a rheostat disposed to be connected in circuit relation with each of the opposed field windings, and means comprising a pair of opposed switching units, each having a plurality of self-biased switching members and a common driving element therefor disposed for movement in response to the voltage across the armature winding of the generator disposed to simultaneously operate the switching units to simultaneously but inversely vary the connections of the rheostats to vary the excitation of the opposed field windings, the opposed field windings and the series field winding of the exciter cooperating to control the excitation of the generator and maintain the voltage across the armature winding thereof substantially constant.

SIMON L. LINDBECK.

REFERENCES CITED

The following references are of record in the file of this patent:

UNITED STATES PATENTS

| Number | Name | Date |
|---|---|---|
| 2,238,811 | Crever | Apr. 15, 1941 |
| 1,003,416 | Barry | Sept. 19, 1911 |
| 1,998,209 | Sundhaussen | Apr. 16, 1935 |
| 2,309,558 | Weatherly | Jan. 26, 1943 |